US00RE46502E

(19) United States
(12) Reissued Patent
Jin

(10) Patent Number: US RE46,502 E
(45) Date of Reissued Patent: Aug. 1, 2017

(54) HIGH EFFICIENCY LED DRIVING METHOD

(71) Applicant: Microsemi Corporation, Aliso Viejo, CA (US)

(72) Inventor: Xiaoping Jin, Orange, CA (US)

(73) Assignee: Microsemi Corporation, Aliso Viejo, CA (US)

(21) Appl. No.: 14/608,242

(22) Filed: Jan. 29, 2015

Related U.S. Patent Documents

Reissue of:
(64) Patent No.: 8,598,795
Issued: Dec. 3, 2013
Appl. No.: 13/461,793
Filed: May 2, 2012

U.S. Applications:
(60) Provisional application No. 61/482,116, filed on May 3, 2011.

(51) Int. Cl.
*H05B 37/02* (2006.01)
*H05B 33/08* (2006.01)

(52) U.S. Cl.
CPC ..... *H05B 33/0827* (2013.01); *H05B 33/0815* (2013.01)

(58) Field of Classification Search
USPC ..... 315/186
See application file for complete search history.

(56) References Cited

U.S. PATENT DOCUMENTS 2,429,162 A 10/1947 Keiser et al.
2,440,984 A 5/1948 Summers
2,572,258 A 10/1951 Goldfield et al.
2,965,799 A 12/1960 Brooks et al.
2,968,028 A 1/1961 Goto et al.
3,141,112 A 7/1964 Eppert
3,565,806 A 2/1971 Ross
3,597,656 A 8/1971 Douglas
3,611,021 A 10/1971 Wallace
3,683,923 A 8/1972 Anderson
3,737,755 A 6/1973 Calkin et al.
3,742,330 A 6/1973 Hodges et al.
3,936,696 A 2/1976 Gray
3,944,888 A 3/1976 Clark
(Continued)

FOREIGN PATENT DOCUMENTS

EP 0326114 8/1989
EP 0587923 3/1994
(Continued)

OTHER PUBLICATIONS

Supplementary European Search Report for Application No. EP 04794179, dated May 15, 2007.
(Continued)

*Primary Examiner* — Angela M Lie
(74) *Attorney, Agent, or Firm* — Simon Kahn

(57) ABSTRACT

An arrangement wherein a plurality of LED strings are driven with a balanced drive signal, i.e. a drive signal wherein the positive side and negative side are of equal energy over time, is provided. In a preferred embodiment, the drive signal is balanced responsive to a capacitor provided between a switching network and a driving transformer. Balance of current between various LED strings is provided by a balancing transformer.

20 Claims, 5 Drawing Sheets

(56) References Cited

U.S. PATENT DOCUMENTS 4,060,751 A 11/1977 Anderson
4,353,009 A 10/1982 Knoll
4,388,562 A 6/1983 Josephson
4,441,054 A 4/1984 Bay
4,463,287 A 7/1984 Pitel
4,523,130 A 6/1985 Pitel
4,562,338 A 12/1985 Okami
4,567,379 A 1/1986 Corey et al.
4,572,992 A 2/1986 Masaki
4,574,222 A 3/1986 Anderson
4,622,496 A 11/1986 Dattilo et al.
4,630,005 A 12/1986 Clegg et al.
4,663,566 A 5/1987 Nagano
4,663,570 A 5/1987 Luchaco et al.
4,672,300 A 6/1987 Harper
4,675,574 A 6/1987 Delflache
4,686,615 A 8/1987 Ferguson
4,698,554 A 10/1987 Stupp et al.
4,700,113 A 10/1987 Stupp et al.
4,761,722 A 8/1988 Pruitt
4,766,353 A 8/1988 Burgess
4,780,696 A 10/1988 Jirka
4,847,745 A 7/1989 Shekhawat et al.
4,862,059 A 8/1989 Tominaga et al.
4,893,069 A 1/1990 Harada et al.
4,902,942 A 2/1990 El-Hamamsy
4,939,381 A 7/1990 Shibata et al.
5,023,519 A 6/1991 Jensen
5,030,887 A 7/1991 Guisinger
5,036,255 A 7/1991 McKnight et al.
5,057,808 A 10/1991 Dhyanchand
5,173,643 A 12/1992 Sullivan et al.
5,349,272 A 9/1994 Rector
5,434,477 A 7/1995 Crouse et al.
5,475,284 A 12/1995 Lester et al.
5,485,057 A 1/1996 Smallwood et al.
5,519,289 A 5/1996 Katyl et al.
5,539,281 A 7/1996 Shackle et al.
5,557,249 A 9/1996 Reynal
5,563,473 A 10/1996 Mattas et al.
5,574,335 A 11/1996 Sun
5,574,356 A 11/1996 Parker
5,615,093 A 3/1997 Nalbant
5,619,402 A 4/1997 Liu
5,621,281 A 4/1997 Kawabata et al.
5,652,479 A 7/1997 LoCascio et al.
5,712,776 A 1/1998 Palara et al.
5,754,012 A 5/1998 LoCascio et al.
5,818,172 A 10/1998 Lee
5,822,201 A 10/1998 Kijima
5,825,133 A 10/1998 Conway
5,828,156 A 10/1998 Roberts
5,854,617 A 12/1998 Lee et al.
5,892,336 A 4/1999 Lin et al.
5,910,713 A 6/1999 Nishi et al.
5,912,812 A 6/1999 Moriarty, Jr.
5,914,842 A 6/1999 Sievers
5,923,129 A 7/1999 Henry
5,930,121 A 7/1999 Henry
5,930,126 A 7/1999 Griffin et al.
5,936,360 A 8/1999 Kaneko
6,002,210 A 12/1999 Nilssen
6,020,688 A 2/2000 Moisin
6,028,400 A 2/2000 Pol et al.
6,037,720 A 3/2000 Wong et al.
6,038,149 A 3/2000 Hiraoka et al.
6,040,662 A 3/2000 Asayama
6,043,609 A 3/2000 George et al.
6,049,177 A 4/2000 Felper
6,072,282 A 6/2000 Adamson
6,104,146 A 8/2000 Chou et al.
6,108,215 A 8/2000 Kates et al.
6,114,814 A 9/2000 Shannon et al.
6,121,733 A 9/2000 Nilssen
6,127,785 A 10/2000 Williams
6,127,786 A 10/2000 Moisin
6,137,240 A 10/2000 Bogdan
6,150,772 A 11/2000 Crane
6,169,375 B1 1/2001 Moisin
6,181,066 B1 1/2001 Adamson
6,181,083 B1 1/2001 Moisin
6,181,084 B1 1/2001 Lau
6,188,553 B1 2/2001 Moisin
6,198,234 B1 3/2001 Henry
6,198,236 B1 3/2001 O'Neill
6,215,256 B1 4/2001 Ju
6,218,788 B1 4/2001 Chen et al.
6,259,615 B1 7/2001 Lin
6,281,636 B1 8/2001 Okutsu et al.
6,281,638 B1 8/2001 Moisin
6,307,765 B1 10/2001 Choi
6,310,444 B1 10/2001 Chang
6,316,881 B1 11/2001 Shannon et al.
6,320,329 B1 11/2001 Wacyk
6,323,602 B1 11/2001 De Groot et al.
6,344,699 B1 2/2002 Rimmer
6,362,577 B1 3/2002 Ito et al.
6,370,444 B1 * 4/2002 Kusunoki ..... G11B 17/225 700/214
6,396,722 B2 5/2002 Lin
6,417,631 B1 7/2002 Chen et al.
6,420,839 B1 7/2002 Chiang et al.
6,433,492 B1 8/2002 Buonavita
6,441,943 B1 8/2002 Roberts et al.
6,445,141 B1 9/2002 Kastner et al.
6,459,215 B1 10/2002 Nerone et al.
6,459,216 B1 10/2002 Tsai
6,469,922 B2 10/2002 Choi
6,472,827 B1 10/2002 Nilssen
6,472,876 B1 10/2002 Notohamiprodjo et al.
6,486,618 B1 11/2002 Li
6,494,587 B1 12/2002 Shaw et al.
6,501,234 B2 12/2002 Lin et al.
6,509,696 B2 1/2003 Bruning et al.
6,515,427 B2 2/2003 Oura et al.
6,515,881 B2 2/2003 Chou et al.
6,522,558 B2 2/2003 Henry
6,531,831 B2 3/2003 Chou et al.
6,534,934 B1 3/2003 Lin et al.
6,559,606 B1 5/2003 Chou et al.
6,570,344 B2 5/2003 Lin
6,628,093 B2 9/2003 Stevens
6,633,138 B2 10/2003 Shannon et al.
6,680,834 B2 1/2004 Williams
6,717,371 B2 4/2004 Klier et al.
6,717,372 B2 4/2004 Lin et al.
6,765,354 B2 7/2004 Klien et al.
6,781,325 B2 8/2004 Lee
6,784,627 B2 8/2004 Suzuki et al.
6,804,129 B2 10/2004 Lin
6,864,867 B2 3/2005 Biebl
6,870,330 B2 3/2005 Choi
6,922,023 B2 7/2005 Hsu et al.
6,930,893 B2 8/2005 Vinciarelli
6,936,975 B2 8/2005 Lin et al.
7,242,147 B2 7/2007 Jin
2001/0036096 A1 11/2001 Lin
2002/0030451 A1 3/2002 Moisin
2002/0097004 A1 7/2002 Chiang et al.
2002/0135319 A1 9/2002 Bruning et al.
2002/0140538 A1 10/2002 Yer et al.
2002/0145886 A1 10/2002 Stevens
2002/0171376 A1 11/2002 Rust et al.
2002/0180380 A1 12/2002 Lin
2002/0180572 A1 12/2002 Kakehashi et al.
2002/0181260 A1 12/2002 Chou et al.
2002/0195971 A1 12/2002 Qian et al.
2003/0001524 A1 1/2003 Lin et al.
2003/0015974 A1 1/2003 Klier et al.
2003/0080695 A1 5/2003 Ohsawa
2003/0090913 A1 5/2003 Che-Chen et al.
2003/0117084 A1 6/2003 Stack
2003/0122502 A1 7/2003 Clauberg et al.

(56) References Cited

U.S. PATENT DOCUMENTS

| | | | | |
|---|---|---|---|---|
| 2003/0141829 | A1 | 7/2003 | Yu et al. | H05B 41/2822 315/276 |
| 2004/0000879 | A1 | 1/2004 | Lee | |
| 2004/0032223 | A1 | 2/2004 | Henry | |
| 2004/0155596 | A1 | 8/2004 | Ushijima et al. | |
| 2004/0257003 | A1 | 12/2004 | Hsieh et al. | |
| 2004/0263092 | A1 | 12/2004 | Liu | |
| 2005/0093471 | A1 | 5/2005 | Jin | |
| 2005/0093472 | A1 | 5/2005 | Jin | |
| 2005/0093482 | A1 | 5/2005 | Ball | |
| 2005/0093483 | A1 | 5/2005 | Ball | |
| 2005/0093484 | A1 | 5/2005 | Ball | |
| 2005/0099143 | A1 | 5/2005 | Kohno | |
| 2005/0156539 | A1 | 7/2005 | Ball | |
| 2005/0162098 | A1 | 7/2005 | Ball | |
| 2005/0225261 | A1 | 10/2005 | Jin | |
| 2006/0022612 | A1 | 2/2006 | Henry | |
| 2008/0061716 | A1 | 3/2008 | Kim | |
| 2008/0116816 | A1 | 5/2008 | Neuman et al. | |
| 2008/0136769 | A1 | 6/2008 | Kim et al. | |
| 2010/0109560 | A1 | 5/2010 | Yu et al. | |
| 2010/0194199 | A1 | 8/2010 | Kimura et al. | |
| 2010/0237802 | A1 | 9/2010 | Aso | |
| 2010/0327761 | A1* | 12/2010 | Jin | 315/219 |
| 2011/0068700 | A1 | 3/2011 | Fan | |
| 2011/0216567 | A1* | 9/2011 | Fan | 363/131 |
| 2012/0062147 | A1* | 3/2012 | Fan | 315/297 |
| 2012/0146546 | A1* | 6/2012 | Hu et al. | 315/297 |
| 2012/0274136 | A1* | 11/2012 | Ge et al. | 307/32 |

FOREIGN PATENT DOCUMENTS

| | | | |
|---|---|---|---|
| EP | 0597661 | | 5/1994 |
| EP | 0647021 | A1 | 9/1994 |
| EP | 0838272 | A2 | 4/1998 |
| EP | 1956288 | A1 | 8/2008 |
| EP | 2278857 | A2 | 1/2011 |
| JP | 06181095 | A | 12/1992 |
| JP | 5-90897 | | 12/1993 |
| JP | 06168791 | A | 6/1994 |
| JP | 8-204488 | | 8/1996 |
| JP | 11238589 | A | 2/1998 |
| JP | 2000030880 | A | 7/1998 |
| JP | 11305196 | A | 11/1999 |
| JP | 2002367835 | A | 6/2001 |
| TW | 485701 | | 5/2002 |
| TW | 556860 | | 1/2003 |
| TW | 0554643 | | 9/2003 |
| TW | 200501829 | | 1/2005 |
| WO | WO 94/15444 | | 7/1994 |
| WO | WO 96/38024 | | 11/1996 |

OTHER PUBLICATIONS

Office Action China Patent Office dated Jun. 5, 2014 for parallel application 201280018780.1.

Werner Thomas and Johannes Pforr; A Novel Low-Cost Current-Sharing Method for Automotive LED-Lighting Systems; 13th European Conference on Power Electronics and Applications, 2009. published by IEEE New York, 2009.

Baddela S M et al; "Parallel Connected LEDs Operated at High Frequency to Improve Current Sharing"; Industry Applications Conference 2004, 39th IAS Annual Meeting, pp. 1677-1681, published Oct. 2004, IEEE Piscataway, NJ.

Sungjin Choi et al; "Symmetric Current Balancing Circuit for Multiple DC Loads"; Applied Power Electronics Conference and Exposition 2010; pp. 512-518, published Feb. 2010, IEEE Piscataway, NJ.

Werner Thomas et al; "A Novel Low-Cost Current-Sharing Method for Automotive LED Lighting Systems"; 13th European Conference on Power Electronics and Applications, 2009; pp. 1-10, published Sep. 2009, IEEE Piscataway, NJ.

International Search Report by European Patent Office for PCT application PCT/US2011/042909 dated Feb. 6, 2012.

Written Opinion of the International Searching Authority by European Patent Office for PCT application PCT/US2011/042909 dated Feb. 6, 2012.

Williams, B.W.; "Power Electronics Devices, Drivers, Applications and Passive Components"; Second Edition, McGraw-Hill, 1992; Chapter 10, pp. 218-249.

Bradley, D.A., "Power Electronics" 2nd Edition; Chapman & Hall, 1995; Chapter 1, pp. 1-38.

Dubey, G. K., "Thyristorised Power Controllers"; Halsted Press, 1986; pp. 74-77.

Supplementary European Search Report for Applications No. EP 04794179 dated May 15, 2007.

Examination Report for Application No. EP 04794179, dated Oct. 16, 2007.

Taiwan Examination Report for Application No. 094110958, dated Mar. 20, 2008, 9 pages.

International Search Report for parallel PCT application PCT/US2012/035924 mailed Oct. 23, 2012 by European Patent Office.

Written Opinion of the International Searching Authority for parallel PCT application PCT/US2012/035924 mailed Oct. 23, 2012 by European Patent Office.

* cited by examiner

HIGH EFFICIENCY LED DRIVING METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application claims priority from U.S. Provisional Patent Application Ser. No. 61/482,116 filed May 3, 2011, entitled "High Efficiency LED Driving Method", the entire contents of which is incorporated herein by reference.

FIELD OF THE INVENTION

The present invention relates to the field of solid state lighting, and in particular to an LED driving arrangement with a balancer and a capacitively coupled driving signal.

BACKGROUND OF THE INVENTION

Light emitting diodes (LEDs) have become very popular for use as lighting devices due to their advantages of high efficiency, long life, mechanical compactness and robustness, and low voltage operation, without limitation. Application areas include liquid crystal display (LCD) backlight, general lighting, and signage display. LEDs exhibit similar electrical characteristics to diodes, i.e. LEDs only conduct current when the forward voltage across the device reaches its conduction threshold, denoted $V_F$, and when the forward voltage increases above $V_F$ the current flowing through the device increases sharply. As a result a particular drive circuit has to be furnished in order to control the LED current stably.

The existing approach in today's market normally uses a switching type DC to DC converter, typically in a current control mode, to drive the LED lighting device. Because of the limited power capacity of a single LED device, in most applications multiple LED's are connected in series to form a LED string, and multiple such LED strings work together, typically in parallel, to produce the desired light intensity. In multiple LED string applications a DC to DC converter is normally employed to supply a DC voltage sufficient for the LED operation, however because the operating voltage of LEDs have a wide tolerance (+/−5% to +/−10%), an individual control circuit has to be deployed with each LED string to regulate its current. For simplicity, such a current regulator typically employs a linear regulation technique, wherein a power regulation device is connected in series with the LED string and the LED current is controlled by adjusting the voltage drop across the power regulating device. Unfortunately, such an approach consumes excessive power and generates excessive heat because of the power dissipation of the linear regulation devices. In some approaches a switching type DC to DC converter is provided for each LED string. Such an approach yields a high efficiency operation but the associated costs also increase dramatically.

What is needed, and not provided by the prior art, is an LED drive method with high operating efficiency and a low system cost, which provides a balancing function between the various LED strings of a multiple LED string luminaire.

SUMMARY OF THE INVENTION

Accordingly, it is a principal object of the present invention to overcome at least some of the disadvantages of the prior art. This is provided in certain embodiments by an arrangement wherein a plurality of LED strings are driven with a balanced drive signal, i.e. a drive signal wherein the positive side and negative side are forced to be of equal energy over time. In a preferred embodiment, the drive signal is balanced responsive to a capacitor provided between a switching network and a driving transformer. Balance of current between various LED strings is provided by a balancing transformer.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF PREFERRED EMBODIMENTS

Figure 1:
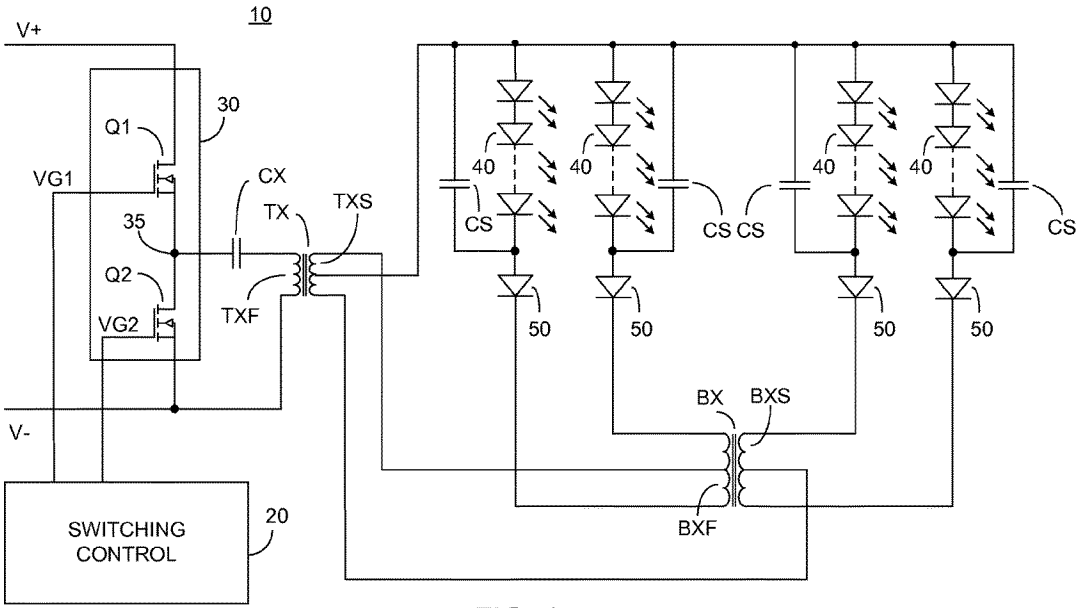
FIG. 1 illustrates a high level schematic diagram of an embodiment of a driving arrangement for four LED strings wherein the anode end of each of the LED strings are commonly coupled to the center tap of a driving transformer, and wherein the cathode ends of the LED strings are each coupled to respective ends of windings of a balancing transformer via respective unidirectional electronic valves.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 illustrates a high level schematic diagram of an embodiment of a driving arrangement 10 comprising: a switching control circuit 20; a switching bridge 30 comprising a first electronically controlled switch Q1 and a second electronically controlled switch Q2; a DC blocking capacitor CX; a driving transformer TX comprising a first winding TXF magnetically coupled to a second winding TXS; first, second, third and fourth LED strings 40; a balancing transformer BX comprising a first winding BXF magnetically coupled to a second winding BXS; a first, second, third and fourth smoothing capacitors CS; and a first, second, third and fourth unidirectional electronic valve 50. First and second electronically controlled switches Q1, Q2 are illustrated without limitation as NMOSFETs, however this is not meant to be limiting in any way. Switching bridge 30 is illustrated as a half bridge, however this is not meant to be limiting in any way, and in particular embodiment a full bridge is implemented without exceeding the scope.

A first output of switching control circuit 20, denoted VG1, is coupled to the control input of first electronically controlled switch Q1 of switching bridge 30, and a second output of switching control circuit 20, denoted VG2, is coupled to the control input of second electronically controlled switch Q2 of switching bridge 30. The drain of first electronically controlled switch Q1 is coupled to a source of electrical power, denoted V+, and the source of first electronically controlled switch Q1 is coupled to drain of second electronically controlled switch Q2 and to a first end of DC blocking capacitor CX. The common node of the source of first electronically controlled switch Q1, the drain of second electronically controlled switch Q2, and the first end of DC blocking capacitor CX is denoted node 35. The second end of DC blocking capacitor CX is coupled to a first end of first winding TXF, and a second end of first winding TXF is coupled to the source of second electronically controlled switch Q2, and to the return of the source of electrical power, denoted V−.

A center tap of second winding TXS is coupled to the anode end of each of the LED strings 40 and to a first end of each of the smoothing capacitors CS. The cathode end of each of the LED strings 40 is coupled to a second end of a respective smoothing capacitor CS and to the anode of a respective unidirectional electronic valve 50. The cathode of a first unidirectional electronic valve is coupled to a first end of first winding BXF, the cathode of a second unidirectional electronic valve 50 is coupled to a second end of first winding BXF, the cathode of a third unidirectional electronic valve 50 is coupled to a first end of second winding BXS, and the cathode of a fourth unidirectional electronic valve 50 is coupled to a second end of second winding BXS. A center tap of first winding BXF is coupled to a first end of second winding TXS, and a center tap of second winding BXS is coupled to a second end of second winding TXS.

In operation, and as will be described further below, driving arrangement 10 provides a balanced current for 4 LED strings 40 with a single balancing transformer BX. The 4 LED strings 40 are configured with a common anode structure. The balancing transformer BX has two center tapped windings, each of the two windings BXF and BXS having the same number of turns. The center taps of BXF, BXS and TXS are each preferably arranged such that an equal number of turns are exhibited between the center tap and the respective opposing ends of the winding.

Switching control circuit 20 is arranged to alternately close first electronically controlled switch Q1 and second electronically controlled switch Q2 so as to provide a switching cycle having a first period during which electrical energy is output from second winding TXS with a first polarity and a second period during which electrical energy is output from second winding TXS with a second polarity, the second polarity opposite the first polarity.

During the first period, when the end of second winding TXS coupled to the center tap of first winding BXF is negative in relation to the center tap of second winding TXS, current flows through the two LED strings 40 coupled to the respective ends of first winding BXF. During the second period, when the end of second winding TXS coupled to the center tap of second winding BXS is negative in relation to the center tap of second winding TXS, current flows through the two LED strings 40 coupled to the respective ends of second winding BXS. The current through the two LED strings 40 conducting during the first period are forced to be equal by the balancing effect of the two winding halves of first winding BXF, and current through the two LED strings 40 conducting during the second period are forced to be equal by the balancing effect of the two winding halves of second winding BXS. DC blocking capacitor CX ensures that the current flowing through first winding TXF, and hence transferred to second winding TXS, during each of the two periods is equal, because DC blocking capacitor CX does not couple DC current in steady state. In the event that the average operating voltage of the two LED strings 40 coupled to first winding BXF is different than the average operating voltage of the two LED strings 40 coupled to second winding BXS, a DC bias will automatically develop across DC blocking capacitor CX to offset the average operating voltage difference. The DC bias acts to maintain an equal total current for each of the two string groups, i.e. the first group comprising two LED strings 40 coupled to first winding BXF and the second group comprising two LED strings 40 coupled to second winding BXS.

To further clarify and illustrate this relationship, we denote the current through the two LED strings 40 coupled to first winding BXF, respectively, as $I_{LED1}$ and $I_{LED2}$. We further denote the current through the two LED strings 40 coupled to second winding BXS, respectively, as $I_{LED3}$ and $I_{LED4}$. This results in the following relations.

$$I_{LED1}+I_{LED2}=I_{LED3}+I_{LED4} \text{ (Responsive to CX)} \quad \text{EQ. 1}$$

$$I_{LED1}=I_{LED2},\ I_{LED3}=I_{LED4} \text{ (Responsive to BX)} \quad \text{EQ. 2}$$

And as result of EQ. 1 and EQ. 2: $I_{LED1}=I_{LED2}=I_{LED3}=I_{LED4}$

Smoothing capacitors CS are each connected in parallel with a respective one of LED strings 40 to smooth out any ripple current and maintain the associated LED current to be nearly a constant direct current. Unidirectional electronic valves 50 are arranged to block any reverse voltage to LED strings 40 and further prevent bleeding of current between respective smoothing capacitors CS.

Figure 2:
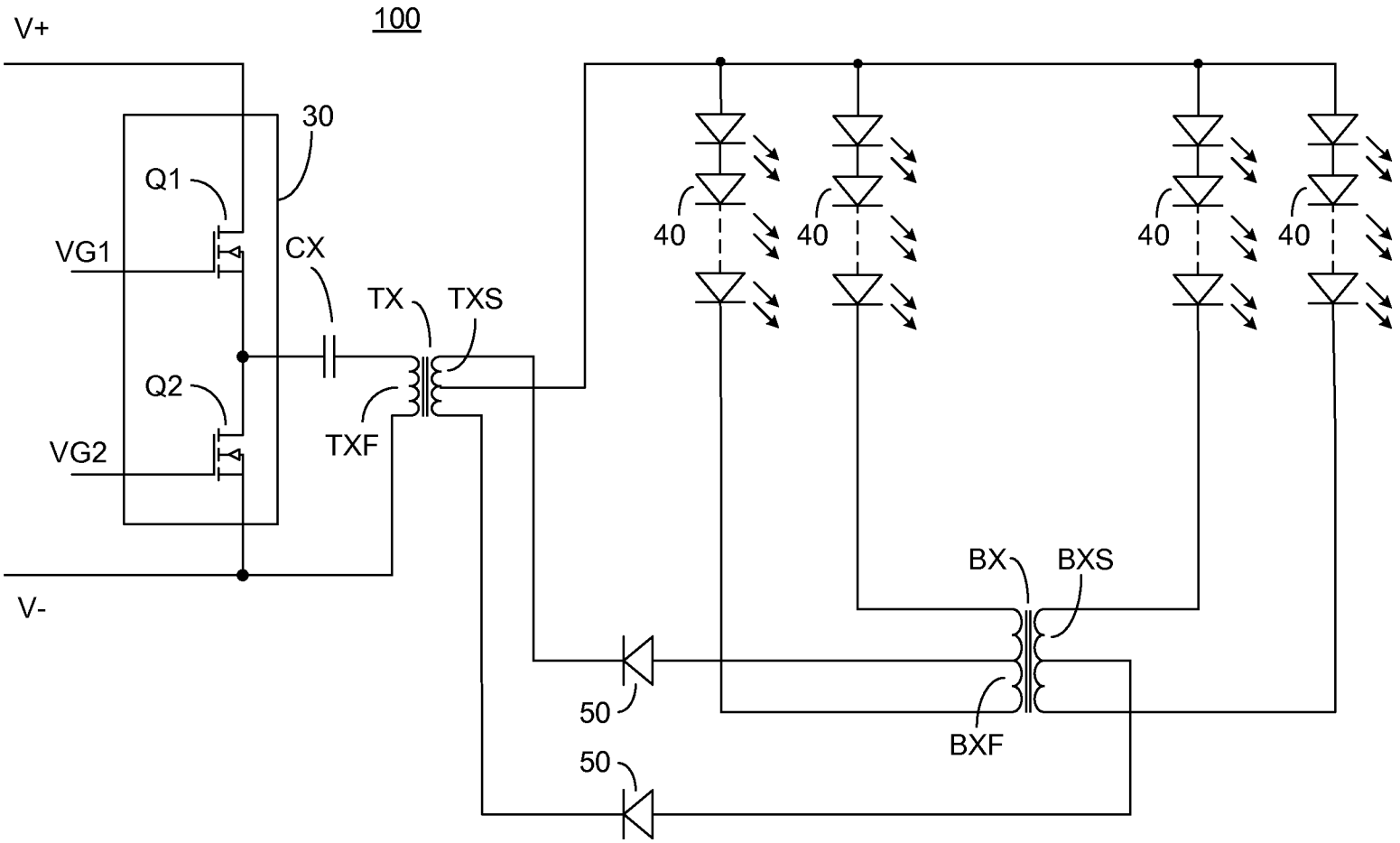
FIG. 2 illustrates a high level schematic diagram of an embodiment of a driving arrangement for four LED strings wherein the anode end of each of the LED strings are commonly coupled to the center tap of a driving transformer, the cathode ends are each coupled to respective ends of windings of a balancing transformer, and the center taps of the balancing transformer windings are coupled to the driving transformer second winding ends via respective unidirectional electronic valves.

FIG. 2 illustrates a high level schematic diagram of an embodiment of a driving arrangement 100 for four LED strings 40, wherein the anode end of each LED string 40 is commonly coupled to the center tap of second winding TXS of driving transformer TX, the cathode ends of the various LED strings 40 are each coupled to respective ends of windings of balancing transformer BX, and the center taps of the balancing transformer windings, BXS and BXF, are coupled to driving transformer second winding TXS via respective unidirectional electronic valves 50. Driving arrangement 100 is a simplified version of driving arrangement 10, wherein LED strings 40 are allowed to operate with a rippled current, and thus smoothing capacitors CS are not supplied and only a single unidirectional electronic valve 50 is required for each two LED strings 40.

In some further detail, the center tap of second winding TXS is commonly coupled to the anode end of each of the four LED strings 40. The cathode end of first LED string 40 is coupled to a first end of first winding BXF; the cathode end of second LED string 40 is coupled to a second end of first winding BXF; the cathode end of third LED string 40 is coupled to a first end of second winding BXS; and the cathode end of fourth LED string 40 is coupled to a second end of second winding BXS. The center tap of first winding BXF is coupled via a respective unidirectional electronic valve 50 to a first end of second winding TXS and the center tap of second winding BXS is coupled via a respective unidirectional electronic valve 50 to a second end of second winding TXS. Switching control circuit 20 is not shown for simplicity, and the connections of switching bridge 30, DC blocking capacitor CX and first winding TXF are as described above in relation to driving arrangement 10.

The operation of driving arrangement 100 is in all respects similar to the operation of driving arrangement 10, and thus in the interest of brevity will not be further detailed.

Figure 3:
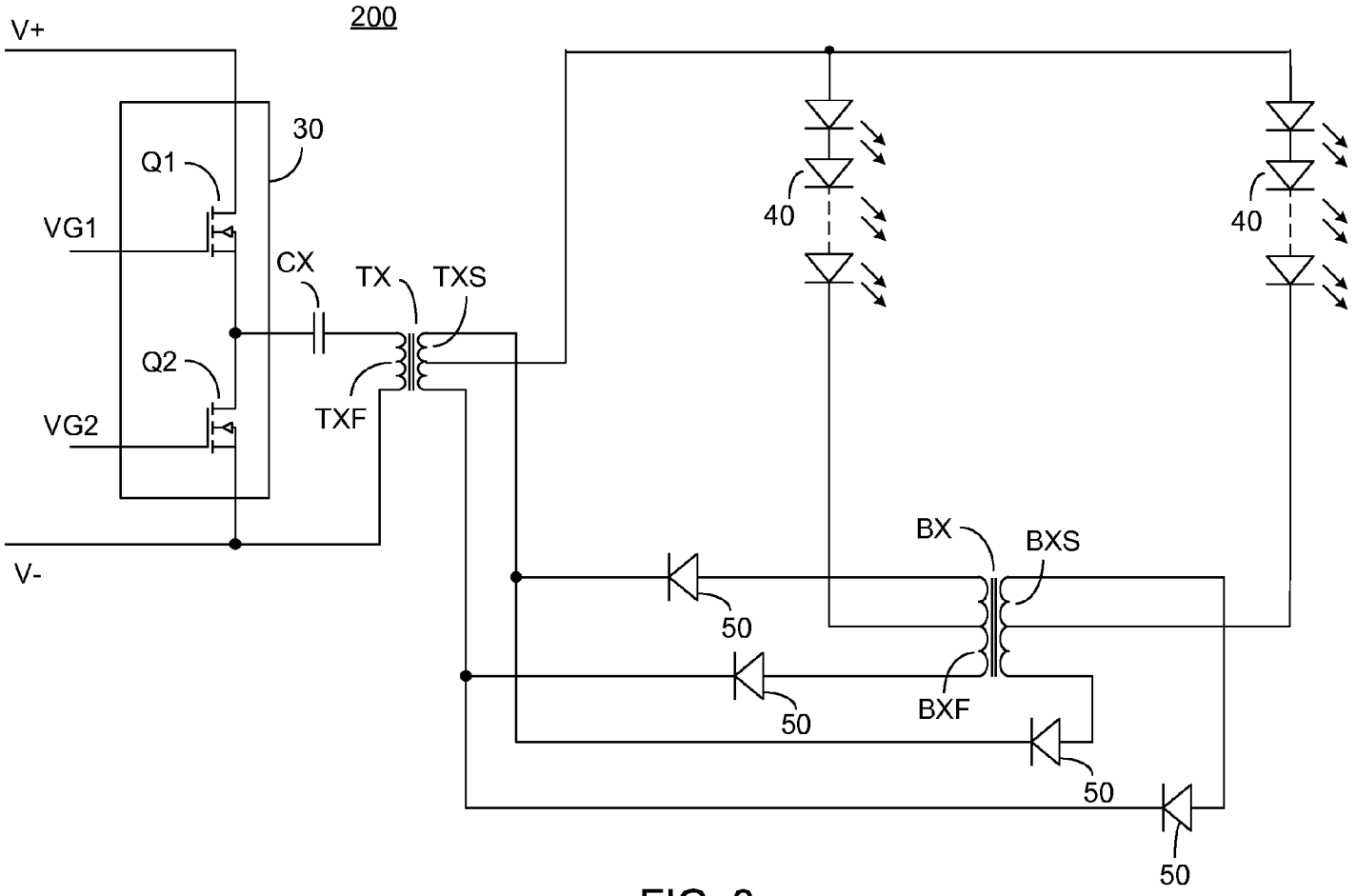
FIG. 3 illustrates a high level schematic diagram of an embodiment of a driving arrangement for two LED strings wherein the anode end of each of the LED strings are commonly coupled to the center tap of a driving transformer, the cathode ends of the LED strings are each coupled to a center tap of respective windings of a balancing transformer, and the balancing transformer winding ends are coupled to the driving transformer second winding ends via respective unidirectional electronic valves.

FIG. 3 illustrates a high level schematic diagram of an embodiment of a driving arrangement 200 having two LED strings 40. Switching control circuit 20 is not shown for simplicity, and the connections of switching bridge 30, DC blocking capacitor CX and first winding TXF are as described above in relation to driving arrangement 10. The anode end of each of the LED strings 40 are commonly coupled to the center tap of second winding TXS of driving transformer TX. The cathode end of a first LED string 40 is coupled to a center tap of first winding BXF of balancing transformer BX, and the cathode end of a second LED string 40 is coupled to a center tap of second winding BXS of balancing transformer BX. The ends of first winding BXF are each coupled via a respective unidirectional electronic valve 50 to respective ends of second winding TXS of driving transformer TX and respective ends of second winding BXF are each coupled via a respective unidirectional electronic valve 50 to respective ends of second winding TXS of driving transformer TX.

Each winding of balancing transformer BX thus drives a single LED string 40. The LED strings 40 each conduct in both half cycles and therefore the ripple current frequency is twice that of the switching frequency of Q1 and Q2. Opposing halves of first winding BXF conduct during the respective first and second periods generated by switching control circuit 20 and opposing halves of second winding BXS conduct during the respective first and second periods generated by switching control circuit 20 (not shown). Therefore the core of balancer transformer BX experiences an AC excitation. The connection polarity of balancer windings BXF and BXS is such so as to always keep the magnetization force generated by the current of the two LED strings 40 in opposite directions, and by such magnetization force the current of the two LED strings 40 are forced to be equal.

Driving arrangements 10, 100 and 200 illustrate a common anode structure for LED strings 40, however this is not meant to be limiting in any way, as will be further illustrated below.

Figure 4:
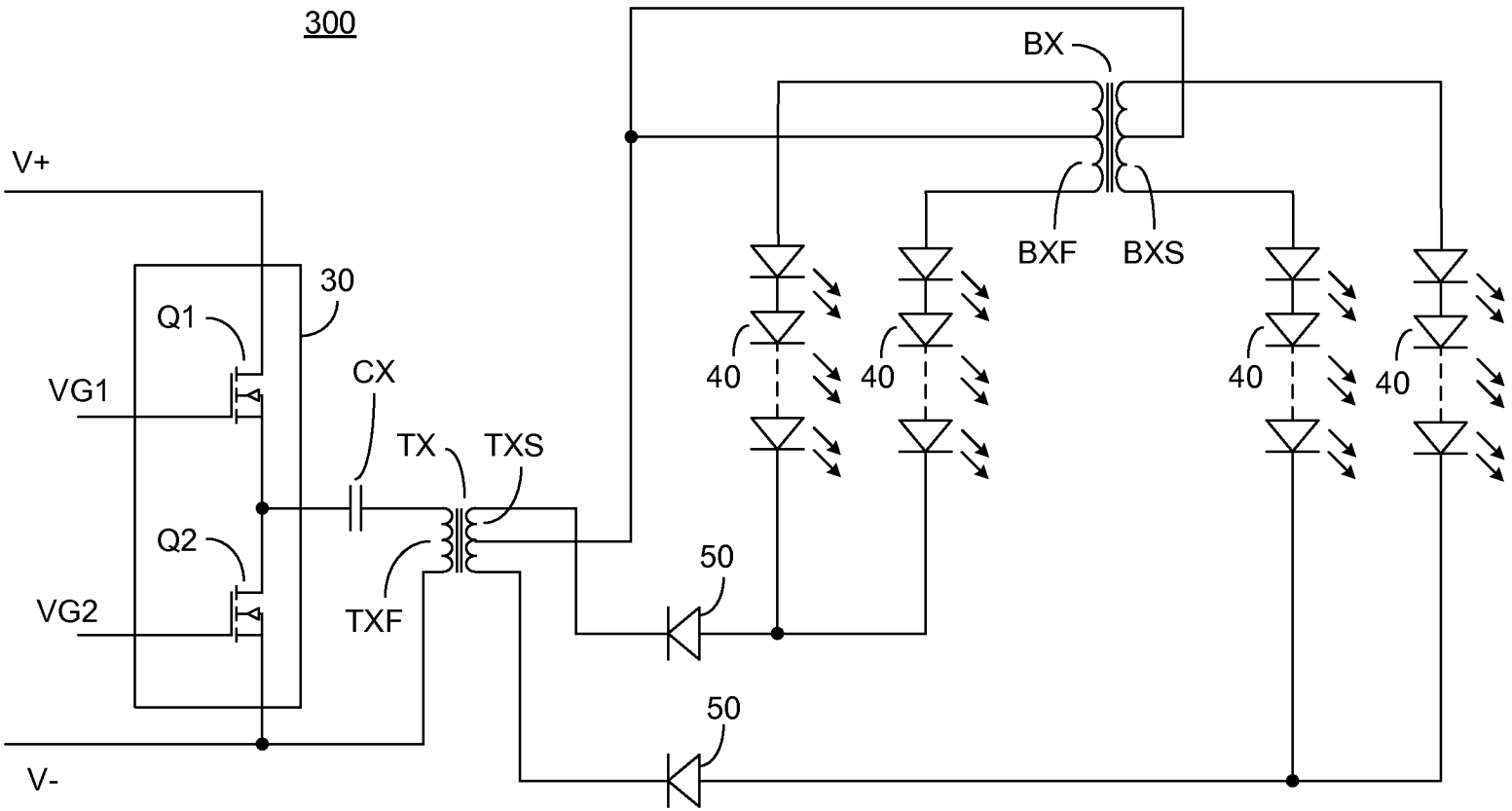
FIG. 4 illustrates a high level schematic diagram of an embodiment of a driving arrangement for four LED strings wherein the cathode ends of a first two of the LED strings are commonly coupled to a first end of the second winding of a driving transformer, the cathode ends of a second two of the LED strings are commonly coupled to a second end of the second winding of the driving transformer, and the anode ends of the LED strings are each coupled to respective ends of windings of a balancing transformer.

FIG. 4 illustrates a high level schematic diagram of an embodiment of a driving arrangement 300 exhibiting four LED strings 40. Switching control circuit 20 is not shown for simplicity, and the connections of switching bridge 30, DC blocking capacitor CX and first winding TXF are as described above in relation to driving arrangement 10. The cathode ends of a first two LED strings 40 are commonly coupled to a first end of second winding TXS of driving transformer TX via a common respective unidirectional electronic valve 50 and the cathode ends of a second two LED strings 40 are commonly coupled to a second end of second winding TXS of driving transformer TX via a common respective unidirectional electronic valve 50. The anode end of first LED string 40 is coupled to a first end of first winding BXF of balancing transformer BS; the anode end of second LED string 40 is coupled to a second end of first winding BXF of balancing transformer BS; the anode end of third LED string 40 is coupled to a first end of second winding BXS of balancing transformer BS; and the anode end of fourth LED string 40 is coupled to a second end of second winding BXS of balancing transformer BS. The center taps of each of first winding BXF and second winding BXS are commonly coupled to the center tap of second winding TXS of driving transformer TX.

The operation of driving arrangement 300 is in all respects similar to the operation of driving arrangement 100, with first and second LED 40 providing illumination during one of the first and second periods, and the third and fourth LED 40 providing illumination during the other of the first and second periods, and in the interest of brevity will not be detailed further.

Figure 5:
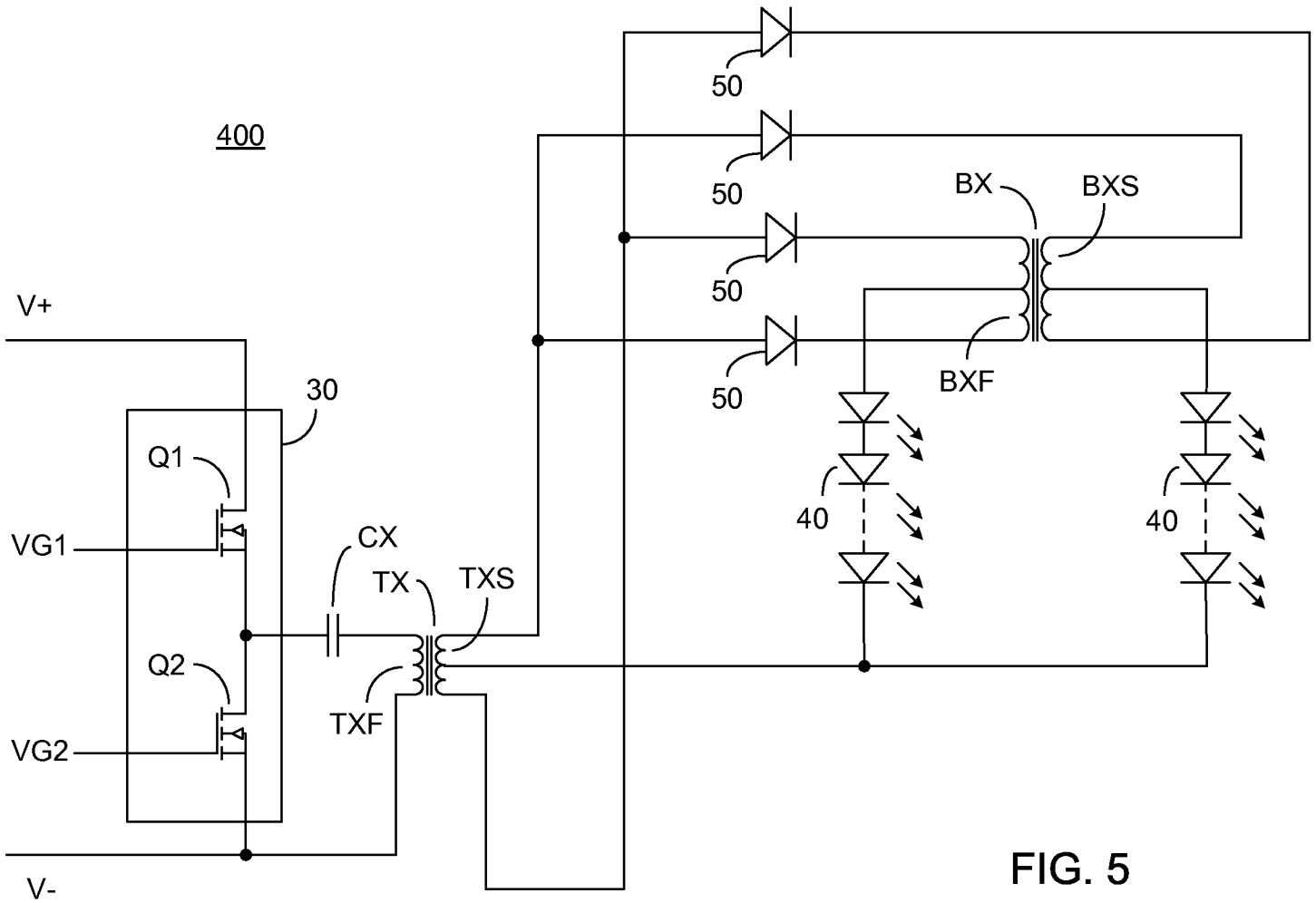
FIG. 5 illustrates a high level schematic diagram of an embodiment of a driving arrangement for two LED strings wherein the cathode end of each of the LED strings are commonly coupled to the center tap of a driving transformer, the anode ends of the LED strings are each coupled to a center tap of respective windings of a balancing transformer, and the balancing transformer winding ends are coupled to the driving transformer second winding ends via respective unidirectional electronic valves.

FIG. 5 illustrates a high level schematic diagram of an embodiment of a driving arrangement 400 for two LED strings 40 wherein the cathode end of each of the LED strings 40 are commonly coupled to the center tap of second winding TXS of driving transformer TX. Switching control circuit 20 is not shown for simplicity, and the connections of switching bridge 30, DC blocking capacitor CX and first winding TXF are as described above in relation to driving arrangement 10. The anode end of first LED string 40 is coupled to the center tap of first winding BXF of balancing transformer BX and the anode end of second LED string 40 is coupled to the center tap of second winding BXS of balancing transformer BX. A first end of first winding BXF is coupled via a respective unidirectional electronic valve 50 to a first end of second winding TXS of driving transformer TX; a second end of first winding BXF is coupled via a respective unidirectional electronic valve 50 to a second end of second winding TXS of driving transformer TX; a first end of second winding BXS is coupled via a respective unidirectional electronic valve 50 to a first end of second winding TXS of driving transformer TX; and a second end of second winding BXS is coupled via a respective unidirectional electronic valve 50 to a second end of second winding TXS of driving transformer TX.

The operation of driving arrangement 400 are in all respects identical with the operation of driving arrangement 200, with the appropriate changes in polarity as required, and thus in the interest of brevity will not be further detailed.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described herein above. Rather the scope of the present invention is defined by the appended claims and includes both combinations and sub-combinations of the various features described hereinabove as well as variations and modifications thereof which would occur to persons skilled in the art upon reading the foregoing description and which are not in the prior art.

I claim:

1. A driving arrangement for light emitting diode (LED) based luminaire comprising:

a driving transformer having a first winding and a second winding, the second winding magnetically coupled to the first winding;

a switching control circuit;

a switching bridge comprising a pair of electronically controlled switches coupled to a common node, each of the pair of electronically controlled switches responsive to an output of the switching control circuit, *said common node coupled to a first end of the primary winding of the driving transformer*;

a direct current (DC) blocking capacitor coupled [between the common node of said switching bridge and a first end of] *in series with* the primary winding of the driving transformer;

a balancing transformer having a first winding and a second winding, the second winding magnetically coupled to the first winding;

a first LED string; and a second LED string, a first end of each of said first LED string and said second LED string coupled to the second winding of said driving transformer, and arranged to receive electrical energy there from; and a second end of said first LED string coupled to a first winding of said balancing transformer, and a second end of said second LED string coupled to a second winding of said balancing transformer, said switching control circuit arranged to provide a switching cycle comprising a first period wherein electrical energy is output from the second winding of said driving transformer with a first polarity, and a second period wherein electrical energy is output from the second winding of said driving transformer with a second polarity, the second polarity opposite the first polarity, said DC blocking capacitor arranged such that the total electrical energy output from the second winding during the first period of the switching cycle is equal to the total electrical energy output from the second winding during the second period of the switching cycle, and said balancing transformer arranged such that the current through said first LED string is equal to the current through said second LED string.

2. The driving arrangement according to claim 1, wherein:

the first end of each of said first LED string and said second LED string are commonly coupled to a center tap of the second winding of said driving transformer;

the second end of said first LED string coupled to a center tap of said first winding of the balancing transformer; and the second end of said second LED string coupled to a center tap of said second winding of the balancing transformer.

3. The driving arranged according to claim 2, wherein:

a first end of the first winding of the balancing transformer is coupled to a first end of the second winding of the driving transformer;

a second end of the first winding of the balancing transformer is coupled to a second end of the second winding of the driving transformer;

a first end of the second winding of the balancing transformer is coupled to the second end of the second winding of the driving transformer; and a second end of the second winding of the balancing transformer is coupled to the first end of the second winding of the driving transformer.

4. The driving arrangement according to claim 2, further comprising:

a first, second, third and fourth unidirectional electronic valve, wherein:

a first end of the first winding of the balancing transformer is coupled to a first end of the second winding of the driving transformer via said first unidirectional electronic valve;

a second end of the first winding of the balancing transformer is coupled to a second end of the second winding of the driving transformer via said second unidirectional electronic valve;

a first end of the second winding of the balancing transformer is coupled to the second end of the second winding of the driving transformer via said third unidirectional electronic valve; and a second end of the second winding of the balancing transformer is coupled to the first end of the second winding of the driving transformer via said fourth unidirectional electronic valve.

5. The driving arrangement according to claim 1, further comprising:

a third LED string; and a fourth LED string, wherein:

a first end of each of said third LED string and said fourth LED string are coupled to the second winding of said driving transformer, and arranged to receive electrical energy there from;

a second end of said third LED string is coupled to the first winding of said balancing transformer; and a second end of said fourth LED string is coupled to the second winding of said balancing transformer, said first winding of said balancing transformer arranged such that the current through said first LED string is equal to the current through said third LED string, and said second winding of said balancing transformer arranged such that the current through said second LED string is equal to the current through said fourth LED string.

6. The driving arrangement according to claim 5, wherein:

the first end of each of the first LED string, the second LED string, the third LED string and the fourth LED string are commonly coupled a center tap of the second winding of said driving transformer;

the second end of said first LED string is coupled to a first end of the first winding of said balancing transformer;

the second end of said second LED string is coupled to a first end of the second winding of said balancing transformer;

the second end of said third LED string is coupled to a second end of the first winding of said balancing transformer;

the second end of said fourth LED string is coupled to a second end of the second winding of said balancing transformer;

a first end of the second winding of said driving transformer is coupled to a center tap of the first winding of the balancing transformer; and a second end of the second winding of said driving transformer is coupled to a center tap of the second winding of the balancing transformer.

7. The driving arrangement according to claim 6, further comprising:

a first, a second, a third and a fourth unidirectional electronic valve, wherein:

the second end of said first LED string is coupled to the first end of the first winding of said balancing transformer via said first unidirectional electronic valve;

the second end of said second LED string is coupled to the first end of the second winding of said balancing transformer via said second unidirectional electronic valve;

the second end of said third LED string is coupled to the second end of the first winding of said balancing transformer via said third unidirectional electronic valve; and the second end of said fourth LED string is coupled to the second end of the second winding of said balancing transformer via said fourth unidirectional electronic valve.

8. The driving arrangement according to claim 6, further comprising:

a first and a second unidirectional electronic valve, wherein:

the first end of the second winding of said driving transformer is coupled to the center tap of the first winding of the balancing transformer via said first unidirectional electronic valve; and the second end of the second winding of said driving transformer is coupled to the center tap of the second winding of the balancing transformer via said second unidirectional electronic valve.

9. The driving arrangement according to claim 5, wherein:

the first end of each of the first LED string and the third LED string are coupled to a first end of the second winding of the driving transformer;

the first end of each of the second LED string and the fourth LED string are coupled to the second of the second winding of the driving transformer;

the second end of the first LED string coupled to a first end of the first winding of the balancing transformer;

the second end of the second LED string coupled to a first end of the second winding of the balancing transformer;

the second end of the third LED string coupled to a second end of the first winding of the balancing transformer; and the second end of the fourth LED string coupled to a second end of the second winding of the balancing transformer.

10. The driving arrangement of claim 9, further comprising:

a first and a second unidirectional electronic valve, wherein:

the first end of the first and third LED strings are coupled to the first end of the second winding of the driving transformer via said first unidirectional electronic valve; and the first end of the second and fourth LED strings are coupled to the second end of the second winding of the driving transformer via said second unidirectional electronic valve.

11. A driving arrangement for light emitting diode (LED) based luminaire comprising:

a means for driving having a first winding and a second winding, the second winding magnetically coupled to the first winding;

a means for switching;

a switching bridge comprising a pair of electronically controlled switches coupled to a common node, each of the pair of electronically controlled switches responsive to an output of the means for switching, *said common node coupled to a first end of the first winding of the means for driving*;

a direct current (DC) blocking capacitor coupled [between the common node of said switching bridge and a first end of the primary] *in series with the first* winding of the means for driving;

a balancing transformer having a first winding and a second winding, the second winding magnetically coupled to the first winding;

a first LED string; and a second LED string, a first end of each of said first LED string and said second LED string coupled to the second winding of said means for driving, and arranged to receive electrical energy there from; and a second end of said first LED string coupled to a first winding of said balancing transformer, and a second end of said second LED string coupled to a second winding of said balancing transformer, said means for switching arranged to provide a switching cycle comprising a first period wherein electrical energy is output from the second winding of said means for driving with a first polarity, and a second period wherein electrical energy is output from the second winding of said means for driving with a second polarity, the second polarity opposite the first polarity, said DC blocking capacitor arranged such that the total electrical energy output from the second winding during the first period of the switching cycle is equal to the total electrical energy output from the second winding during the second period of the switching cycle, and said balancing transformer arranged such that the current through said first LED string is equal to the current through said second LED string.

12. The driving arrangement according to claim 11, wherein:

the first end of each of said first LED string and said second LED string are commonly coupled to a center tap of the second winding of said means for driving;

the second end of said first LED string coupled to a center tap of said first winding of the balancing transformer; and the second end of said second LED string coupled to a center tap of said second winding of the balancing transformer.

13. The driving arranged according to claim 12, wherein:

a first end of the first winding of the balancing transformer is coupled to a first end of the second winding of the means for driving;

a second end of the first winding of the balancing transformer is coupled to a second end of the second winding of the means for driving;

a first end of the second winding of the balancing transformer is coupled to the second end of the second winding of the means for driving; and a second end of the second winding of the balancing transformer is coupled to the first end of the second winding of the means for driving.

14. The driving arrangement according to claim 12, further comprising:

a first, second, third and fourth unidirectional electronic valve, wherein:

a first end of the first winding of the balancing transformer is coupled to a first end of the second winding of the means for driving via said first unidirectional electronic valve;

a second end of the first winding of the balancing transformer is coupled to a second end of the second winding of the means for driving via said second unidirectional electronic valve;

a first end of the second winding of the balancing transformer is coupled to the second end of the second winding of the means for driving via said third unidirectional electronic valve; and a second end of the second winding of the balancing transformer is coupled to the first end of the second winding of the means for driving via said fourth unidirectional electronic valve.

15. The driving arrangement according to claim 11, further comprising:

a third LED string; and a fourth LED string, wherein:

a first end of each of said third LED string and said fourth LED string are coupled to the second winding of said means for driving, and arranged to receive electrical energy there from;

a second end of said third LED string is coupled to the first winding of said balancing transformer; and a second end of said fourth LED string is coupled to the second winding of said balancing transformer, said first winding of said balancing transformer arranged such that the current through said first LED string is equal to the current through said third LED string, and said second winding of said balancing transformer arranged such that the current through said second LED string is equal to the current through said fourth LED string.

16. The driving arrangement according to claim 15, wherein:

the first end of each of the first LED string, the second LED string, the third LED string and the fourth LED string are commonly coupled a center tap of the second winding of said means for driving;

the second end of said first LED string is coupled to a first end of the first winding of said balancing transformer;

the second end of said second LED string is coupled to a first end of the second winding of said balancing transformer;

the second end of said third LED string is coupled to a second end of the first winding of said balancing transformer;

the second end of said fourth LED string is coupled to a second end of the second winding of said balancing transformer;

a first end of the second winding of said means for driving is coupled to a center tap of the first winding of the balancing transformer; and a second end of the second winding of said means for driving is coupled to a center tap of the second winding of the balancing transformer.

17. The driving arrangement according to claim 16, further comprising:

a first, a second, a third and a fourth unidirectional electronic valve, wherein:

the second end of said first LED string is coupled to the first end of the first winding of said balancing transformer via said first unidirectional electronic valve;

the second end of said second LED string is coupled to the first end of the second winding of said balancing transformer via said second unidirectional electronic valve;

the second end of said third LED string is coupled to the second end of the first winding of said balancing transformer via said third unidirectional electronic valve; and the second end of said fourth LED string is coupled to the second end of the second winding of said balancing transformer via said fourth unidirectional electronic valve.

18. The driving arrangement according to claim 16, further comprising:

a first and a second unidirectional electronic valve, wherein:

the first end of the second winding of said means for driving is coupled to the center tap of the first winding of the balancing transformer via said first unidirectional electronic valve; and the second end of the second winding of said means for driving is coupled to the center tap of the second winding of the balancing transformer via said second unidirectional electronic valve.

19. The driving arrangement according to claim 15, wherein:

the first end of each of the first LED string and the third LED string are coupled to a first end of the second winding of the means for driving;

the first end of each of the second LED string and the fourth LED string are coupled to the second of the second winding of the means for driving;

the second end of the first LED string coupled to a first end of the first winding of the balancing transformer;

the second end of the second LED string coupled to a first end of the second winding of the balancing transformer;

the second end of the third LED string coupled to a second end of the first winding of the balancing transformer; and the second end of the fourth LED string coupled to a second end of the second winding of the balancing transformer.

20. The driving arrangement of claim 19, further comprising:

a first and a second unidirectional electronic valve, wherein:

the first end of the first and third LED strings are coupled to the first end of the second winding of the means for driving via said first unidirectional electronic valve; and the first end of the second and fourth LED strings are coupled to the second end of the second winding of the means for driving via said second unidirectional electronic valve.

* * * * *